(12) United States Patent  
Kato et al.

(10) Patent No.: US 6,679,585 B2
(45) Date of Patent: Jan. 20, 2004

(54) INK JET RECORDING HEAD AND INK JET RECORDING APPARATUS

(75) Inventors: Masao Kato, Tochigi (JP); Nobuyuki Matsumoto, Tokyo (JP); Daisaku Ide, Tokyo (JP); Yoichi Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,571

(22) Filed: Aug. 31, 2001

(65) Prior Publication Data

US 2002/0054187 A1 May 9, 2002

(30) Foreign Application Priority Data

Sep. 4, 2000 (JP) ......................... 2000/267799

(51) Int. Cl.[7] .................................................. B41J 2/21
(52) U.S. Cl. ............................................ 347/43; 347/96
(58) Field of Search ......................... 347/43, 15, 40, 347/96, 100, 33; 106/31.27

(56) References Cited

U.S. PATENT DOCUMENTS

| 5,428,383 A | 6/1995 | Shields et al. .................. 347/96 |
| 5,488,402 A | 1/1996 | Shields et al. .................. 347/96 |
| 5,976,230 A | 11/1999 | Askeland et al. ........ 106/31.27 |
| 6,126,268 A | * 10/2000 | Askeland et al. .............. 347/43 |
| 6,209,985 B1 | * 4/2001 | Minamizawa ................. 347/43 |
| 6,342,095 B1 | * 1/2002 | Takizawa .................. 106/31.27 |

FOREIGN PATENT DOCUMENTS

| EP | 0 576 151 A1 | 12/1993 |
| EP | 0 586 079 A1 | 3/1994 |
| EP | 0 791 473 A2 | 8/1997 |
| EP | 0 956 960 A2 | 11/1999 |
| EP | 0 956 961 A2 | 11/1999 |
| JP | 6-106841 | 4/1994 |
| JP | 11-334101 | 12/1999 |
| JP | 11-343441 | 12/1999 |

* cited by examiner

*Primary Examiner*—Lamson Nguyen
(74) *Attorney, Agent, or Firm*—Fitzpatrick, Cella, Harper & Scinto (57) ABSTRACT

The ink jet recording head 1 of the invention is provided with a black ink nozzle array Bk1 for black ink constituting first ink, and plural color ink nozzle arrays C1 to C3 for discharging color inks. In a color ink nozzle array C1 having the shortest print distance from the black print formed by the black ink nozzle array Bk1, there is introduced a color ink showing the highest mutual reactivity with the black ink, and a color ink showing the next highest mutual reactivity is introduced into a nozzle array C2 having the next shortest print distance, and a color ink showing the lowest mutual reactivity is introduced into a nozzle array C3 having the longest print distance.

8 Claims, 5 Drawing Sheets

INK JET RECORDING HEAD AND INK JET RECORDING APPARATUS

BACKGROUND OF THE INVENTION

1. Field of the Invention

The present invention relates to an ink jet recording head and an ink jet recording apparatus for recording an image by discharging ink onto a recording medium.

2. Related Background Art

In the field of ink jet recording head and ink jet recording apparatus, there is conventionally known to use pigment-containing black ink for forming a black image excellent in print density, print quality, moisture resistance and light resistance particularly on plain paper or to use an ink set capable of preventing a bleeding phenomenon generated at the boundary of an image area printed with black ink and an image area printed with color ink or an uneven white image aberration (hereinafter called "white fog") generated in a black image area at the boundary with color ink.

As representative technologies, the Japanese Patent Applications Laid-open Nos. 6-106841, 9-1188505, 11-334101 and 11-343441 and the U.S. Pat. Nos. 5,428,383, 5,488,402 and 5,976,230 disclose an ink set capable of reducing the bleeding phenomenon and composed of black ink and color inks of which at least one is mutually reactive with the black ink while the remainder is not reactive with the black ink, and an ink jet recording method utilizing such ink set. In order to prevent the bleeding at the boundary between a print area with the black ink and a print area with a color ink not reactive with the black ink, there is particularly disclosed a printing method in which the color ink having the reactivity is printed in superposed manner in the black ink print area (such method being hereinafter called "underprinting").

As the black ink and the color ink mutually reactive therewith, to be employed in such underprinting method, there is known a combination of a black ink containing a black coloring material including a hydrophilic radical and a mutually reactive color ink containing a reactive agent consisting of a metal ion. When these inks are coated on the recording medium and are mixed thereon to induce a reaction between the hydrophilic radical and the metallic ion, there is generated a precipitate of the black coloring material. Thus the black coloring material can be prevented from moving to the print area of the non-reactive ink adjacent to the print area of the black ink, thereby reducing the bleeding phenomenon generated between the print area of the black ink and the print area of the non-reactive color ink.

However the investigation of the present inventors has newly revealed the following drawbacks on the ink jet recording head and the ink jet recording apparatus employed in such underprinting method.

A first drawback is that a higher concentration of metal ions in the color ink for increasing the mutual reactivity with the black ink is desirable for reducing the bleeding phenomenon or the white fog phenomenon but results in deterioration of the ink discharging face of the recording head by the metal ions contained in the ink mist deposited on the ink discharging head or an increased viscosity of the ink resulting from a higher concentration of the metal ions added in the ink thereby deteriorating the discharge stability of the ink. In order to avoid such drawback, it is necessary to reduce the entire amount of the metal ions added to the color ink as far as possible while reducing the bleeding and white fog phenomena.

A second drawback is that the aggregate of the metal ions contained in the reactive ink is deposited on the end surface of a wiper, which is provided in the ink jet recording apparatus for wiping the ink discharge face of the recording head, thereby hindering the recovery of the performance of the recording head by the wiper. It is already known to provide wiper cleaning means for cleaning the wiper thereby restoring the wiping performance of the wiper, but it is still difficult to remove the aggregate, if once formed, by such wiper cleaning means and the wiper cleaning means becomes costly if such removing function is added.

A third drawback is that the reduction of the bleeding and white fog phenomenon may result in a reduced print speed, depending on the layout of the arrays of the discharging ports in the ink discharging recording head.

SUMMARY OF THE INVENTION

In consideration of the foregoing, an object of the present invention is to provide an ink jet recording head capable of minimizing the entire amount of the metal ions added to the color ink while reducing the bleeding and white fog phenomena. It is also an object of the present invention to provide an ink jet recording head capable of reducing the bleeding and white fog phenomena while preventing the loss in the recording speed.

Another object of the present invention is to provide an ink jet recording apparatus capable of avoiding deposition of the coagulate of the metal ions contained in the reactive ink on the end surface of the wiper. It is also an object of the present invention to provide an ink jet recording apparatus capable of reducing the bleeding and white fog phenomena while preventing the loss in the recording speed.

The above-mentioned objects can be attained, according to the present invention, by an ink jet recording head provided with plural arrays of discharge ports for discharging plural inks of at least three kinds in which a first ink and at least one of other inks are mutually reactive, wherein, in an array of the discharge ports having a relatively shorter distance from the print obtained by an array of the discharge port for the aforementioned first ink, there is introduced an ink showing a mutual reactivity equal to or higher than that of the ink introduced into an array of the discharge ports having a relatively longer distance from the print obtained by the aforementioned array of the discharge ports.

In the ink jet recording head of the present invention having the above-described configuration, the mutual reactivity, with the first ink, of the inks introduced into the arrays of the discharge ports other than the array for the first ink is highest in the ink introduced into the array having the shortest print distance from the print obtained from the array of the discharge ports for the first ink and becomes lower with the increase in the print distance. Such mutual reactivities of the inks introduced into the arrays of the discharge ports other than the array for the first ink, being lowered in succession with the increase of the print distance from the print by the first ink allows to reduce the entire concentration of the reactive agents (metal ions) in the reactive ink while reducing the bleeding and white fog phenomena, thereby simultaneously achieving higher quality of the printed image and higher reliability of the recording head.

According to the present invention, there is also provided another ink jet recording head provided with plural arrays of discharge ports for discharging plural inks of at least three kinds in which a first ink and at least one of other inks are mutually reactive, wherein, in an array of the discharge ports having a relatively shorter distance from an array of the discharge port for the aforementioned first ink, there is introduced an ink showing a mutual reactivity equal to or relatively higher than that of the ink introduced into an array of the discharge ports having a relatively longer distance from the aforementioned array of the discharge ports.

In such another ink jet recording head of the present invention, the mutual reactivity, with the first ink, of the inks introduced into the arrays of the discharge ports other than the array for the first ink is highest in the ink introduced into the array having the shortest distance from the array of the discharge ports for the first ink and becomes lower with the increase in the distance. Such mutual reactivities of the inks introduced into the arrays of the discharge ports other than the array for the first ink, being lowered in succession with the increase of the distance from the array for the first ink allows to reduce the entire concentration of the reactive agents (metal ions) in the reactive ink while reducing the bleeding and white fog phenomena, thereby simultaneously achieving higher quality of the printed image and higher reliability of the recording head.

Also there may be adopted a configuration in which the aforementioned first ink is black ink and the inks other than the first ink are color inks.

Also there may be adopted a configuration in which the aforementioned color ink showing the mutual reactivity with the aforementioned black ink is introduced only in an array of the discharge ports having the shortest print distance from the black print by the array of the discharge ports for the first ink.

In addition, there may be adopted a configuration in which the aforementioned color ink showing the mutual reactivity contains metal ions.

Furthermore, there may be adopted a configuration in which the aforementioned metal ion is at least a polyvalent metal cation selected from $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

Furthermore, there may be adopted a configuration in which the aforementioned color ink showing the mutual reactivity contains a metal salt in an amount of 0.1 to 15 wt. % with respect to the total weight of the color ink.

Furthermore, there may be adopted a configuration in which the black ink contains a salt and employs a black pigment as the coloring material.

According to the present invention, there is also provided an ink jet recording apparatus mounted with an ink jet recording head provided with plural arrays of discharge ports for discharging plural inks of at least three kinds in which a first ink and at least one of other inks are mutually reactive and adapted to execute recording by discharging ink from the ink jet recording head and depositing such ink onto a recording medium, wherein the ink jet recording head is so constructed that, in an array of the discharge ports having a relatively shorter distance from an array of the discharge port for the aforementioned first ink, there is introduced an ink showing a mutual reactivity equal to or relatively higher than that of the ink introduced into an array of the discharge ports having a relatively longer distance from the aforementioned array of the discharge ports.

Also there may be adopted a configuration in which the aforementioned first ink is black ink and the inks other than the first ink are color inks.

Also the ink jet recording apparatus of the present invention is mounted with the ink jet recording head of the present invention and is adapted to execute recording by discharging ink from the ink jet recording head and depositing the ink onto the recording medium.

According to the present invention, there is also provided an ink jet recording apparatus mounted with an ink jet recording head of the present invention and adapted to execute recording by discharging ink from the ink jet recording head and depositing the ink onto the recording medium and further provided with wiring means for moving a wiper in contact with the ink discharging face of the ink jet recording head thereby cleaning the ink discharging face, wherein the wiper, in wiping the portion of the plural arrays of the discharge ports other than the array for the aforementioned first ink on the ink discharging face, executes wiping operation on the arrays of the discharge ports in succession in the increasing order of the print distance from the print by the array of the discharge ports for the first ink.

In the above-described ink jet recording apparatus of the present invention, the wiping operation is executed in succession from an array of the discharge ports in which an ink having a relatively high concentration of the reactive agent (metal ions) is introduced to an array of the discharge ports in which an ink having a relatively low concentration of the reactive agent is introduced, whereby the ink of a relatively high concentration of the reactive agent, impregnated at first in the wiper, is diluted with the ink or a relatively low concentration of the reactive agent, impregnated later in the wiper, so that the concentration of the reactive agent becomes lower at least at the end portion of the wiper (in contact with the discharge port-bearing face of the recording head) thereby easily preventing the deposition of the aggregate of the reactive agent on the end surface of the wiper.

DESCRIPTION OF THE PREFERRED EMBODIMENTS

Now the present invention will be clarified in detail by preferred embodiments thereof, but the present invention will by no means be limited by such embodiments but is subject to various modifications as long as they remain within the scope of the present invention.

Configuration of Ink Jet Recording Apparatus

Figure 1:
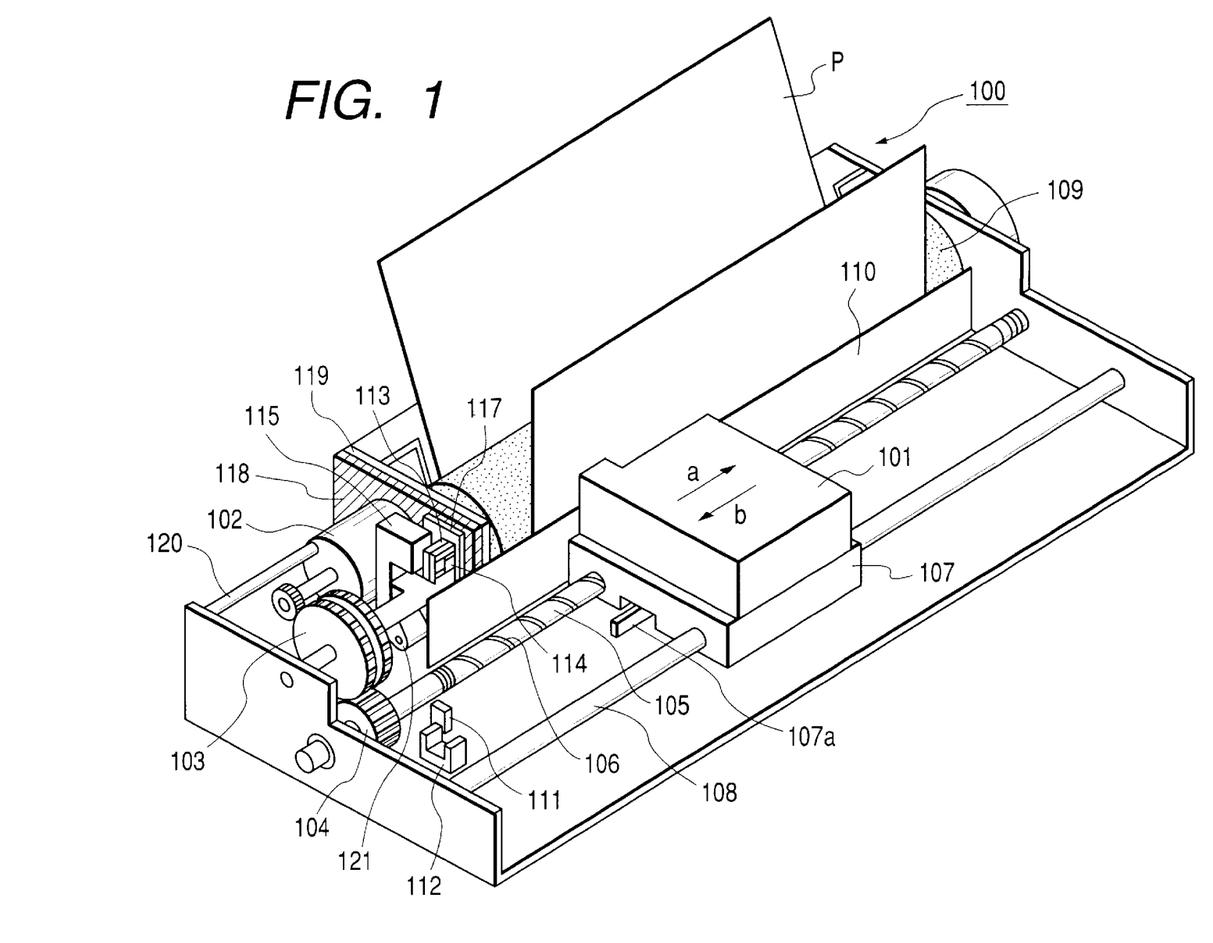
FIG. 1 is a schematic perspective view of an ink jet recording apparatus in which the liquid discharge head of the present invention can be mounted and used.

FIG. 1 is a schematic perspective view showing an example of the ink jet recording apparatus in which the liquid discharge head (also called recording head) to be explained later of the present invention can be mounted and utilized.

Referring to FIG. 1, an ink jet recording head 101 is mounted on a carriage 107 engaging with a spiral groove 106 of a lead screw 105 which is rotated by the forward and reverse rotations of a driving motor 102 through power transmitting gears 103, 104, and is reciprocated in directions a and b, together with the carriage 107, along a guide 108 by the power of the driving motor 102. A pressure plate 110 for a print sheet P (recording medium) conveyed by an unrepresented recording medium conveying device on a platen 109 presses the print sheet P toward the platen 109 over the moving direction of the carriage.

In the vicinity of an end of the aforementioned lead screw 105, there are provided photocouplers 111, 112, which constitute home position detection means for confirming the presence of a lever 107a of the carriage 107 in this area thereby switching the rotating direction of the driving motor 102. There are also shown a support member 113 for supporting a cap member 114 for capping the front face, having the discharge ports, of the aforementioned ink jet recording head 101, and ink suction means 115 for sucking the ink discharged for example by an idle discharge of the head 101 and contained in the cap member 114. The suction means 115 executes suction recovery of the head 101 through an aperture 116 in the cap. There are also shown a cleaning wiper 117 and a moving member 118 for moving the wiper 117, and the wiper 117 and the moving member 118 are supported on a support member 119 of the main body. The wiper 117 is not limited to the illustrated form but can be composed of any other known cleaning wiper. A lever 120 used for starting the suction recovery operation is moved by a cam 121 engaging with the carriage 107, thereby controlling the transmission of the driving power of the motor 102 through known transmission means such as a clutch. An ink jet recording control unit, for supplying heat generating member (not shown) provided in the recording head 101 with drive signals and controlling the function of the aforementioned mechanisms is provided in the main body of the apparatus and is therefore not illustrated.

The ink jet recording apparatus 100 of the above-described configuration executes recording on the print sheet (recording medium) P conveyed on the platen 109 by the unrepresented recording medium conveying device, by the reciprocating motion of the recording head 101 over the entire width of the print sheet P.

Configuration of Liquid Discharge Head

FIGS. 2A, 2B, 2C, 2D, 2E and 2F are cross-sectional views of an embodiment of the liquid discharge head of the present invention along the liquid flow path thereof, showing steps of characteristic phenomena therein.

The liquid discharge head of the present invention is provided, as a discharge energy generating element for discharging liquid, with a heat generating member 52 for applying thermal energy to the liquid, on a flat element substrate 51, and a liquid flow path 10 is provided on the element substrate 51, corresponding to the heat generating member 52. The liquid flow path 10 communicates with a discharge port 18 and also with a common liquid chamber 13 for supplying plural liquid flow paths 10 with liquid, and receives liquid of an amount corresponding to that of the liquid discharged from the discharge port 18. A meniscus M is balanced in the vicinity of the discharge port 18 between a capillary force generated by the internal wall of the discharge port 18 and the liquid flow path 10 communicating therewith and a normally negative internal pressure of the common liquid chamber 13.

The liquid flow path 10 is formed by adjoining the element substrate 51 provided with the heat generating member 52 and a top plate 50, and a bubble generating area 11 for generating a bubble in the discharge liquid by rapid heating of the heat generating member 52 is present in the vicinity of the interface between the heat generating member 52 and the discharge liquid. In the liquid flow path 10 having the bubble generating area 11, a movable member 31 is so provided that at least a part thereof is opposed to the heat generating member 52. The movable member 31 has a free end 32 at the downstream side closer to the discharge port 18 and is supported by a support member 34 provided at the upstream side. Particularly in the present embodiment, in order to suppress the growth of the upstream half of the bubble influencing the backward wave toward the upstream side and the inertial force of the liquid, the free end 32 is positioned at the approximate center of the bubble generating area 11. With the growth of the bubble generated in the bubble generating area 11, the movable member 31 is movable with respect to the support member 34. A fulcrum 33 for such movement constitutes the support portion for the movable member 31 by the support member 34.

Above the central portion of the bubble generating area 11, there is provided a stopper (limiting portion) 64 for limiting the movement of the movable member 31 within a certain range, in order to suppress the growth of the upstream half of the bubble. In the liquid flow from the common liquid chamber 13 to the discharge port 18, there is provided, at the upstream side of the stopper 64, a low flow resistance area 65 in which the flow resistance is relatively lower than that in the liquid flow path 10. In such area 65, the flow path has a structure without the upper wall or with a larger cross section to reduce the resistance to the liquid movement.

The above-described configuration provides a conventionally unavailable characteristic head structure in which the liquid flow path 10 including the bubble generating area 11 constitutes a substantially closed space excluding the discharge port 18, by the contact of the displaced movable member 31 and the stopper 64.

In the following there will be given a detailed explanation on the liquid discharging operation of the liquid discharge head of the present embodiment.

Figure 2A:
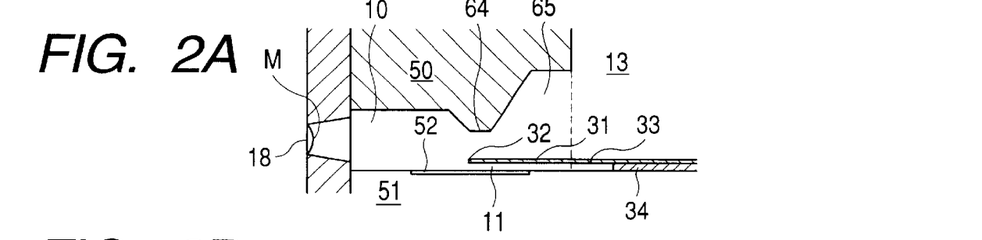
FIGS. 2A, 2B, 2C, 2D, 2E and 2F are cross-sectional views, of an embodiment of the liquid discharge head of the present invention along the liquid flow path thereof, showing steps of characteristic phenomena therein.

FIG. 2A shows a state prior to the application of energy, such as electrical energy, to the heat generating member 52, thus prior to the heat generation by the heat generating member. It is important to note that the movable member 31 is provided in such a position as to be opposed to the upstream half of the bubble generated by the heat from the heat generating member 52, and that the stopper 64 for limiting the movement of the movable member 31 is provided above the center of the bubble generating area 11. Thus, the upstream half of the bubble is suppressed by the movable member 31, by the arrangement thereof and the structure of the liquid flow path.

Figure 2B:
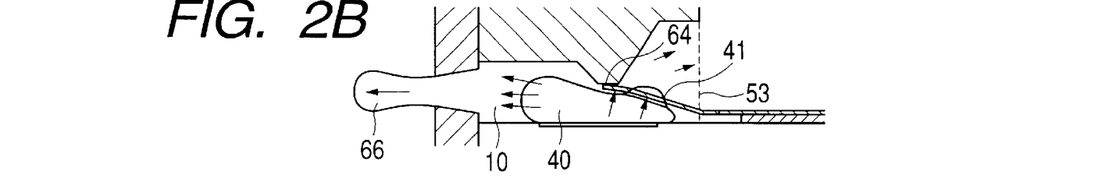

FIG. 2B shows a state where a part of the liquid in the bubble generating area 11 is heated by the heat generating member 52 and a bubble 40 resulting from film boiling has grown almost to maximum. In this state a pressure wave resulting from the generation of the bubble 40 propagates in the liquid flow path 10, whereby the liquid moves to the upstream and downstream sides from the central portion of the bubble generating area, and, at the upstream side, the movable member 31 is displaced by the liquid flow resulting from the growth of the bubble 40 while, in the downstream side, a discharge droplet 66 is going to be discharged from the discharge port 18. The liquid movement in the upstream side, namely toward the common liquid chamber 13, becomes a large flow because of the presence of the low flow resistance area 65 where the resistance of the flow path to the liquid movement is smaller than that in the downstream side and the liquid movement is therefore facilitated, but, when the movable member 31 is displaced to a position close to or in contact with the stopper 64, the displacement beyond such state is limited and the liquid movement toward the upstream side is significantly limited. As a result, the growth of the bubble 40 toward the upstream side is also limited by the movable member 31. In this manner there is formed a maximum flow resistance at the upstream side of the bubble generating area, thereby maintaining the growth of the bubble at the upstream side substantially constant. Such configuration allows to stabilize the formation of the discharge liquid droplet and to improve the characteristics themselves dependent on the response frequency.

Also in such state, since the liquid has a large moving force toward the upstream side, the movable member 31 is subjected to a large tensile stress toward the upstream side. Also a part of the bubble 40, of which growth is limited by the movable member 31, passes through small gaps between the lateral edges of the movable member 31 and the lateral walls constituting the liquid flow path 10 and heaps to the upper face side of the movable member 31. Such bubble will be hereinafter called "heaped bubble (41)".

In this state, the entire liquid flow path from the movable member 31 to the discharge port has a structure of gradually spreading from the upstream side to the downstream side.

In the present embodiment, a portion of the liquid flow path between the bubble 40 at the side of the discharge port and the discharge port has a "linear communication state" in which the flow path is straight with respect to the liquid flow. More preferably, the propagating direction of the pressure wave generated at the bubble formation is made to linearly coincide with the direction of resulting liquid flow and discharge, thereby realizing an ideal state in which the discharge states such as the discharging direction and the discharging speed of the droplet 66 are stabilized in an extremely high level. In the present invention, as a condition for realizing or substantially realizing such ideal state, there can be adopted a configuration where the discharge port 18 and the heat generating member 52, particularly the downstream portion (at the side of the discharge port) of the heat generating member, having influence on the downstream side of the bubble, are linearly connected. Such configuration corresponds to a state where, in the absence of the liquid in the liquid flow path, the heat generating member, particularly the downstream side thereof, can be observed from the outside of the discharge port.

On the other hand, since the displacement of the movable member 31 is limited by the stopper 64, the upstream portion of the bubble 40 remains in a small size, bending the movable member 31 in a convex form toward the upstream side by the inertial force of the liquid flow to the upstream side and charging the movable member 31 with a stress therein. In these areas, the amount of the bubble intruding into the upstream area is maintained substantially null by the stopper, partition wall 53 of the liquid flow path, movable member 31 and fulcrum 33 (though a partially heaped bubble through a gap not exceeding 10 μm between the movable member 31 and the partition wall 53 is tolerated).

In this manner the liquid flow toward the upstream side is significantly limited, thereby avoiding the liquid crosstalk to the neighboring discharge ports and also the reverse liquid flow and the pressure vibration in the liquid supply path, hindering the high speed liquid refilling as will be explained later.

Figure 2C:
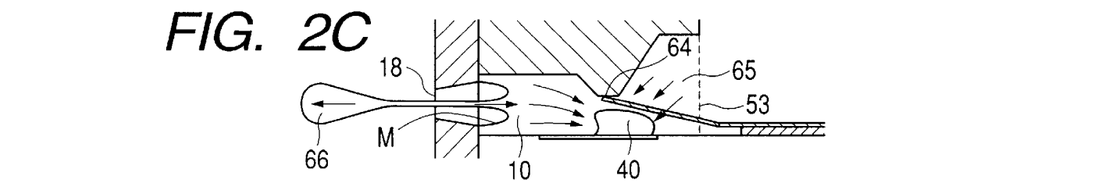

FIG. 2C shows a state where, after the aforementioned film boiling, the negative pressure in the bubble overcomes the liquid movement in the liquid flow path toward the downstream side, whereby the bubble 40 starts to contract. In this point, since the force of the liquid movement in the upstream direction, resulting from the bubble growth, still strongly remains, the movable member 31 remains in contact with the stopper 64 for a certain period after the start of contraction of the bubble 40, whereby the bubble contraction mainly generates a liquid movement from the discharge port 18 toward the upstream side. As the movable member 31 is bent in convex form toward the upstream side and is charged with a stress therein in the state shown in FIG. 2B, it tends, in the state shown in FIG. 2C, to release such stress and to assume a concave form toward the upstream side, thereby pulling back the liquid flow from the upstream side. Thus, at a certain point, such pull-back force of the movable member overcomes the aforementioned moving force of the liquid toward the upstream side thereby generating a slight liquid flow from the upstream side to the discharge port, whereby the movable member 31 decreases its bending and starts displacement to the concave shape toward the upstream direction. Thus, there is temporarily generated an unbalanced state between the upstream and downstream sides of the bubble 40, in which the liquid in the flow path flows toward the discharge port in total.

Immediately thereafter, the liquid flow path 10 including the bubble generating area 11 is still maintained as a substantially closed space, excluding the discharge port 18, by the still remaining contact of the displaced movable member 31 with the stopper 64, so that the contracting energy of the bubble 40 exerts strongly a force for moving the liquid in the vicinity of the discharge port 18 toward the upstream side. At this point, therefore, the meniscus M is significantly drawn from the discharge port 18 into the liquid flow path 10, wherein a liquid column connected with the discharged droplet 66 is promptly cut off with a strong force. As a result, as shown in FIG. 2D, the sub droplet or satellite 67 remaining outside the discharge port 18 becomes reduced.

Figure 2D:
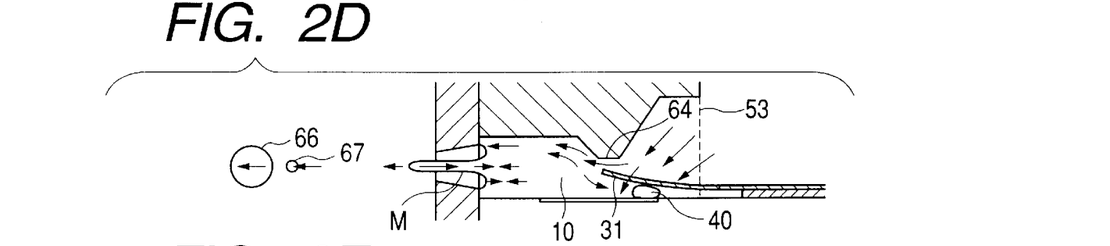

FIG. 2D shows a state where the bubble vanishing process is almost completed and the discharged droplet 66 is separated from the meniscus M. In the low flow resistance area 65, the repulsive force of the movable member 31 and the contacting force of the bubble 40 in vanishing process overcome the moving force of the liquid toward the upstream direction, thereby initiating the downward movement of the movable member 31 and the resulting flow toward the downstream side in the low flow resistance area 65, whereby the movable member 31 and the stopper 64 are being released from the contact or substantially contact state. As a result, the liquid flow toward the downstream side in the low flow resistance area 65 rapidly becomes a large flow because of the low flow resistance, thus entering the liquid flow path 10 through the portion of the stopper 64. Thus the liquid flow, rapidly drawing the meniscus M into the liquid flow path 10, decreases rapidly, and the meniscus M starts to return, at a relatively low speed, to the position prior to the bubble generation, with separating as far as possible the liquid column remaining outside the discharge port 18 or having a convex form toward the discharge port 18. In particular, the returning flow of the meniscus M and the refilling liquid flow from the upstream side are united to form an area where the flow speed is almost zero between the discharge port 18 and the heater 2, thereby achieving prompt convergence of the meniscus M. Thus the present invention allows to significantly reduce the satellite formed by separation of the liquid column and deposited on the print thereby deteriorating the image quality or deposited in the vicinity of the discharge port thereby adversely influencing the discharge direction of the liquid droplet or resulting in defective discharge, though such phenomena depend also on the viscosity and surface tension of the ink.

Also since the meniscus M itself starts to return before being significantly drawn into the liquid flow path and completes returning within a short time even though the liquid moving speed itself is not so large, it is rendered possible to reduce the overshooting of the meniscus, namely the movement of the meniscus to the outside beyond the discharge port 18 and to terminate, within an extremely short period, the attenuating vibration occurring after such overshooting and converging at the discharge port 18. Since such attenuating vibration also detrimentally affects the print quality, the present invention enables high speed printing in stable manner.

Furthermore, since the aforementioned liquid flow into the liquid flow path 10 through the portion between the movable member 31 and the stopper 64 increases the flow speed at the wall of the top plate 50 as shown in FIG. 2D, small bubbles remaining in this area can be extremely reduced to improve the stability of the liquid discharge.

On the other hand, some of the satellites 67 generated immediately after the discharge droplets 66 are very close thereto by the rapid meniscus drawing shown in FIG. 2C, and are subjected to so-called slip stream phenomenon, in which such satellite is pulled toward the discharge droplet 66 by the air eddies generated therebehind.

In the following the above-mentioned phenomenon will be explained in more details. In the conventional liquid discharge head, the liquid droplet does not become a sphere at the moment of discharge from the discharge port but is discharged in a state close to a liquid column having a spherical portion at the leading end. It is also known that a tail portion, when pulled from the main droplet and the meniscus and cut off therefrom, forms a satellite dot which flies toward the recording medium together with the main droplet. Such satellite dot, flying after the main droplet and having a lower flying speed because of being pulled by the meniscus, lands in a position different from the landing position of the main droplet thereby deteriorating the print quality. In the liquid discharge head of the present invention, having a meniscus drawing force larger than in the conventional liquid discharge head, the tail portion following the main droplet is strongly pulled back so that the tail portion and the meniscus are subjected to a stronger separating force and are separated earlier. Consequently, the satellite formed from the tail portion becomes smaller and closer to the main droplet. Moreover, since the tail portion does not continue to be pulled by the meniscus, the discharge speed does not become lower and the satellite 67 is pulled to the discharge droplet 66 by so-called slip stream phenomenon.

Figure 2E:
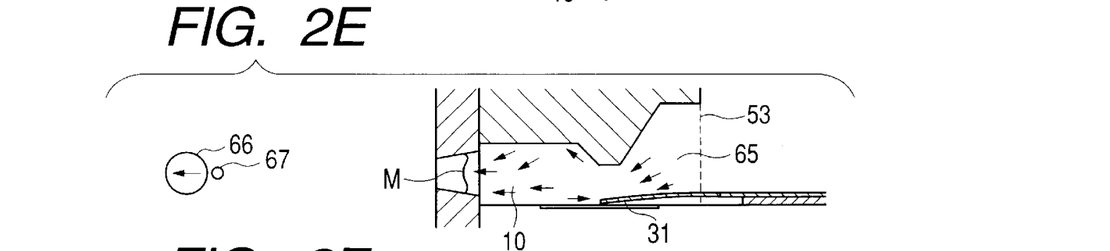

FIG. 2E shows a state where the state shown in FIG. 2D further proceeds. The satellite 67 comes even closer to the droplet 66 and the attractive force by the slip stream phenomenon increases also. On the other hand, the liquid movement from the upstream side to the discharge port 18 induces liquid drawing from the upstream side and liquid push-out toward the discharge port 18, by the completion of extinction of the bubble 40 and the overshooting in the movement of the movable member 31 to a position lower than the initial position. Besides, liquid flow toward the discharge port 18 increases by an increase in the cross section of the liquid flow path including the stopper 64, thereby accelerating the return of the meniscus M to the discharge port 18. These facts drastically improve the refilling characteristics of the present embodiment.

Also in case a cavitation is generated at the vanishing of the bubble, since the bubble vanishing point and the discharge port 18 are separated by the downward movement of the movable member 31, the impact wave result from such cavitation is not directly transmitted to the discharge port 18 but is mainly absorbed by the movable member 31. Thus small droplets, called microdots, are scarcely generated from the meniscus by the impact wave of cavitation reaching the meniscus, and it is rendered possible to drastically reduce the phenomena of deposition of such microdots on the print, resulting in deterioration of the image quality or in the vicinity of the discharge port 18, deteriorating the stability of liquid discharge.

Also the position of cavitation resulting from bubble vanishing is displaced toward the fulcrum by the movable member 31, thereby reducing the damage to the heater 2. Also there is induced a forced movement of viscosified ink between the movable member 31 and the heater 2, thus excluding such ink from the closed area thereby improving the durability of the discharge ability. At the same time, this phenomenon reduces the kogation on the heater in this area, thereby improving the stability of liquid discharge.

Figure 2F:
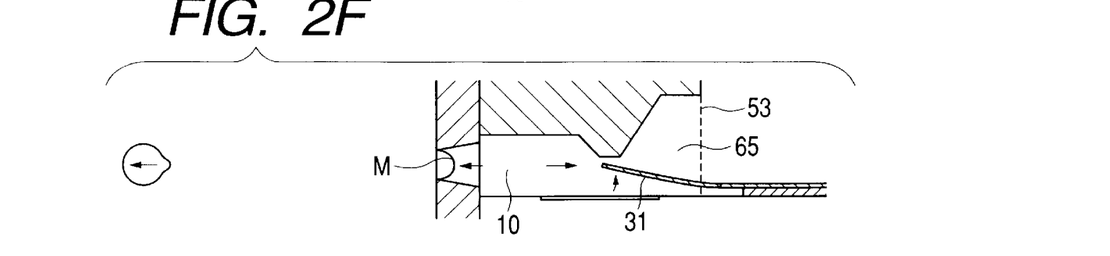

FIG. 2F shows a state where the state shown in FIG. 2E further proceeds and the satellite 67 is captured into the discharge droplet 66. Such uniting of the discharge droplet 66 and the satellite 67 not necessarily occurs at every discharge in other embodiments and may or may not occur depending on various conditions. However, by at least reducing or completely eliminating the satellite, the landing positions of the main droplet and the satellite become scarcely displaced on the recording medium whereby the influence on the print quality becomes extremely small. It is thus rendered possible to increase the image sharpness thereby improving the print quality and to reduce the drawbacks of smearing of the print medium or the interior of the recording apparatus by the mist formed from such satellite.

On the other hand, the movable member 31 starts to move toward the stopper 64 after the overshooting, and such movement converges by an attenuating vibration determined by the shape and Young's modules of the movable member 31, and the viscosity and specific gravity of the liquid in the flow path, and the movable member 31 finally stops at the initial position.

The upward movement of the movable member 31 controls the liquid flow from the common liquid chamber 13 toward the discharge port 18 whereby the movement of the meniscus M promptly converges in the vicinity of the discharge port. It is therefore rendered possible to significantly reduce factors which render the discharge state unstable and deteriorate the print quality, such as the overshooting phenomenon of the meniscus.

The present invention is applicable not only to the liquid discharge head of the above-described configuration but also to a liquid discharge head in which the bubble generated on the heat generating member communicates with the air through the discharge port or a liquid discharge head utilizing an electromechanical converting element such as a piezo element as the discharge energy generating means.

Configuration of Array of Discharge Ports of the Recording Head

Figure 3:
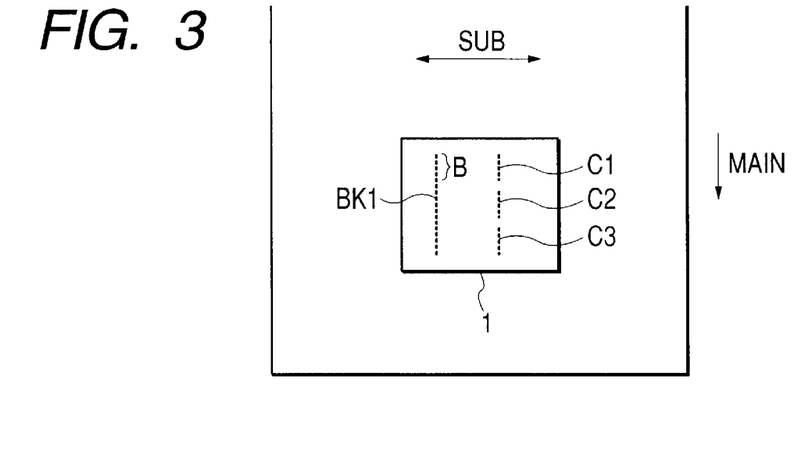
FIGS. 3, 4 and 5 are schematic views showing examples of the configuration of arrays of the discharge ports in the recording head embodying the present invention.
Figure 4:
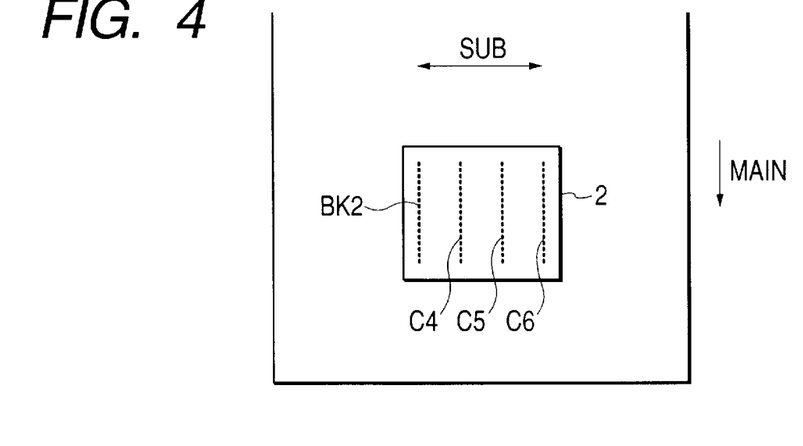
Figure 5:
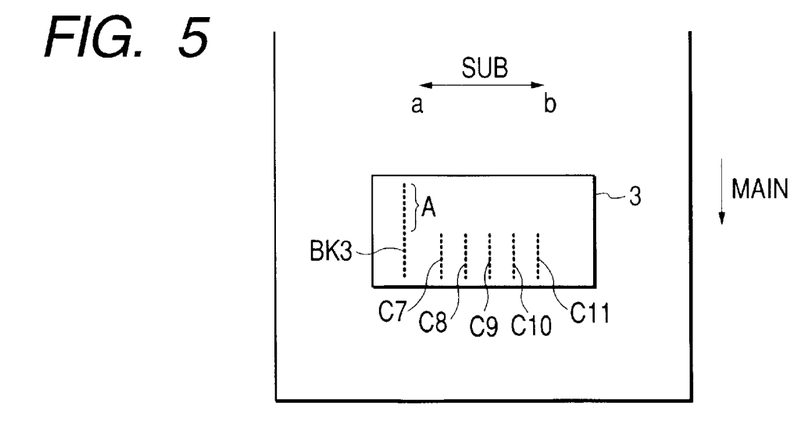

FIGS. 3 to 5 are schematic views showing examples of the configuration of the array of discharge ports in various recording heads realizing the present invention. These drawings show a state looking at the printing surface of the print sheet, through the recording head, wherein MAIN indicates the main scanning direction (sheet conveying direction) and SUB indicates the sub scanning direction.

(1) Recording Head 1

As shown in FIG. 3, the recording head 1 is provided with a discharge port array Bk1 for the black ink as the first ink, and discharge port arrays C1, C2, C3 for the color inks, mutually parallel in the sub scanning direction. The discharge port arrays C1, C2, C3 serve to discharge the color inks of mutually different colors and are arranged linearly along the main scanning direction. The width of the discharge port array Bk1 for the black ink is approximately same as that of the linear arrangement of the three color discharge port arrays C1, C2, C3.

The recording head 1 of the above-described configuration constitutes a representative configuration of the ink jet recording head in which priority is given to the black printing speed and the manufacturing cost of the recording head.

(2) Recording Head 2

As shown in FIG. 4, the recording head 2 is provided with a discharge port array Bk2 for the black ink as the first ink, and discharge port arrays C4, C5, C6 for the color inks, mutually parallel in the sub scanning direction. The discharge port arrays Bk2, C4, C5, C6 have a same width.

The recording head 2 of the above-described configuration constitutes a representative configuration of the ink jet recording head in which priority is given to the printing speed both in the black and in the colors.

(3) Recording Head 3

As shown in FIG. 5, the recording head 3 is provided with a discharge port array Bk3 for the black ink as the first ink, and five discharge port arrays C7 to C11 for the color inks, mutually parallel in the sub scanning direction. The discharge port arrays C7 to C11 for the color inks have a same width, while the discharge port array Bk3 for the black ink has a width about twice of that of the discharge port arrays C7 to C11 for the color inks.

Such configuration of the recording head 3 not only improves the black printing speed but also allows to obtain a same sequential order of color inks discharged onto the recording sheet in either scanning direction of the recording head 3, by employing inks of a same color in C7 and C11 and in C8 and C10. More specifically, the sequential order of the color inks discharged onto the recording sheet can be made same by discharging the color inks in the order of C7, C8 and C9 in case of scanning of the recording head 3 in a direction a, and in the order of C11, C10 and C9 in case of scanning of the recording head 3 in a direction b.

In contrast to other recording heads (for example that shown in FIG. 4) in which the sequential order of colors is different between the forward and reverse scanning motions, the recording head 3 is free from the difference in color generation, resulting from different sequential superposing orders of the inks on the recording sheets caused by the switching of the scanning direction, thereby enabling satisfactory printing in both scanning directions and achieving high-speed color printing.

In case of executing black printing only with the recording head 3, the black discharge port array Bk3 is activated over the entire width thereof, thereby high-speed printing operation. On the other hand, in case the black printing and color printing are mixed, the black discharge port array Bk3 is used only in a half thereof at the upstream side of the color discharge port arrays C7 to C11 in the sheet conveying direction (namely a portion A in FIG. 5) to execute black printing thereby forming a black print area, prior to the color printing. Then the recording medium is conveyed in the sheet conveying direction by a half of the width of the black discharge port array Bk3 and the color printing is executed on the aforementioned black print area.

Ink (1) Black Ink

As the black pigment in the black ink, for example carbon black can be advantageously employed. The carbon black may be dispersed in the ink by self dispersion or by a dispersant.

(Self Dispersion Carbon Black)

Self dispersion carbon black can be, for example, carbon black in which at least a hydrophilic radical (anionic or cationic) is bonded as an ionic radical to the surface of carbon black either directly or through another atomic group. Such self dispersion carbon black allows to reduce or dispense with the addition of a dispersant for dispersing the carbon black.

In carbon black in which an anionic radical is bonded to the surface either directly or through another atomic group, examples of the surfacially bonded hydrophilic radical include —COO(M2), —SO$_3$(M2), —PO$_3$H(M2) and —PO$_3$(M2)$_2$, wherein M2 represents a hydrogen atom, an alkali metal, an ammonium radical or an organic ammonium radical. Among these, self dispersion carbon black charged anionically by surfacial bonding of —COO(M2) or —SO$_3$(M2) can be particularly advantageously employed in the present invention, because of satisfactory dispersion property in the ink. Also within M2 mentioned above, examples of alkali metal include Li, Na, K, Rb and Cs, and examples of organic ammonium radical include methyl ammonium, dimethyl ammonium, trimethyl ammonium, ethyl ammonium, diethyl ammonium, triethyl ammonium, methanol ammonium, dimethanol ammonium and trimethanol ammonium. The ink of the present embodiment containing self dispersion carbon black in which M2 is an ammonium radical or an organic ammonium radical can improve the moisture resistance of the recorded image and can therefore be employed particularly advantageously in this regard. This is presumably because ammonium radical is decomposed and ammonia evaporates when such ink is deposited on the recording medium. The self dispersion carbon black in which M2 is an ammonium radical can be obtained, for example, by replacing M2 in the self dispersion carbon black in which M2 is an alkali metal with ammonium salt by an ion exchanging method or by adding an acid to obtain an H type and then adding ammonium hydroxide to add an ammonium radical as M2.

The self dispersion carbon black can be prepared, for example by oxidizing carbon black with sodium hypochlorite thereby chemically bonding —COONa radical to the surface of carbon black.

The various hydrophilic radicals mentioned above may be bonded directly to the surface of carbon black, or indirectly by way of another atomic group. Examples of such another atomic group include a linear or ramified alkylene radical with 1 to 12 carbon atoms, a substituted or unsubstituted phenylene radical and a substituted or unsubstituted naphthylene radical. The substituent for phenylene or naphthylene radical can be, for example, a linear or ramified alkyl radical with 1 to 6 carbon atoms. Also examples of the combination of another atomic group and the hydrophilic radical include —C$_2$H$_4$COO(M2), —Ph—SO$_3$(M2) and —Ph—COO(M2) wherein Ph represents a phenyl radical.

In the present invention, two or more kinds of the above-mentioned self dispersion carbon black may be suitably selected as the coloring material for the ink. Also the added amount of the self dispersion carbon black is preferably within a range of 0.1 to 15 wt. %, particularly 1 to 10 wt. % with respect to the total weight of the ink. Within such range, the self dispersion carbon black can maintain satisfactory dispersion state in the ink. Also a dye may be added as the coloring material, in addition to the self dispersion carbon black, for example in order to adjust the color of the ink.

Ordinary Carbon Black

As the coloring material for the black ink, there may also be employed ordinary carbon black of non-self dispersion type. Such carbon black can be, for example, furnace black, lamp black, acetylene black or channel black, such as Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, Raven 1255 (foregoing being manufactured by Columbia Inc.), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (foregoing being manufactured by Cabott Inc.), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (foregoing manufactured by Degussa Inc.), No. 25, No. 33. No. 40, No. 47, No. 52, No. 900, No. 2300, MCF-88, MA600, MA7, MA8, MA100 (foregoing being manufactured by Mitsubishi Chemical Co.) etc. but these examples are not restrictive and there may be employed conventionally known carbon black. Also magnetic particles such as magnetite or ferrite, or titanium black may be employed as the black pigment.

In case of employing such ordinary carbon black as the color material of the black ink, a dispersant is preferably added in the ink in order to achieve stable dispersion in the aqueous medium. For this purpose there is advantageously employed a dispersant provided for example with an ionic radical and capable by the function thereof of stably dispersing carbon black in the aqueous medium, and examples of such dispersant include styrene-acrylic acid copolymer, styrene-acrylic acid-alkyl acrylate ester copolymer, styrene-maleic acid copolymer, styrene-maleic acid-alkyl acrylate ester copolymer, styrene-methacrylic acid copolymer, styrene-methacrylic acid-alkyl acrylate ester copolymer, styrene-maleic acid half ester copolymer, vinylnaphthalene-acrylic acid copolymer, vinylnaphthalene-maleic acid copolymer, styrene-maleic anhydride-maleic acid half ester copolymer and salts thereof. Among these, there are preferred ones having a weight-averaged molecular weight within a range of 1000 to 30000, particularly 3000 to 15000.

Salt in Black Ink

A salt may be contained in the black ink to avoid fluctuation of the image quality depending on the kind of the recording medium and to provide a high quality image of an extremely high density in stable manner.

Also in case a portion formed solely by the black ink and a portion formed by the mixture of the black ink and the color ink are mixed in the black area in a same document, a salt contained in the ink avoids mutual difference in the black image density between these portions, thereby providing an image without visually unpleasant feeling.

The salt to be contained in the black ink of the present invention is preferably at least one selected from a $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 represents an alkali metal, an ammonium radical or an organic ammonium radical and Ph represents a phenyl radical. Examples of alkali metal include Li, Na, K, Rb and Cs, and examples of organic ammonium radical include methyl ammonium, dimethyl ammonium, trimethyl ammonium, ethyl ammonium, diethyl ammonium, triethyl ammonium, trimethanol ammonium, dimethanol ammonium, trimethanol ammonium, ethanol ammonium, diethanol ammonium and triethanol ammonium. Among the aforementioned salts, particularly sulfuric acid salts (such as potassium sulfate) and benzoic acid salts (such as ammonium benzoate) allow to form the ink jet recorded image of excellent quality on various recording medium due to satisfactory compatibility with self dispersion carbon black, more specifically due to an excellent solid-liquid separating effect when deposited on the recording medium.

The content of the coloring material, for example the self dispersion carbon black, in the black ink of the present invention is preferably within a range of 0.1 to 15 wt. %, particularly 1 to 10 wt. % with respect to the total weight of the ink. Also the content of the salt is preferably within a range of 0.05 to 10 wt. %, particularly 0.1 to 5 wt. % with respect to the total weight of the ink. The contents of the coloring material and the salt in the black ink within the aforementioned ranges allow to provide more excellent effects.

Aqueous Medium in Black Ink

The aqueous medium to be employed in the black ink of the present invention can be, for example, water or a mixture of water and a water-soluble organic solvent. As the water-soluble organic solvent, there is particularly preferred a solvent having an effect of preventing ink drying. Examples of such solvent include alkyl alcohols with 1 to 4 carbon atoms such as methyl alcohol, ethyl alcohol, n-propyl alcohol, isopropyl alcohol, n-butyl alcohol, sec-butyl alcohol or tert-butyl alcohol; amides such as dimethylformamide or dimethylacetamide; ketones or ketoalcohols such as acetone or diacetone alcohol; ethers such as tetrahydrofurane or dioxane; polyalkyleneglycols such as polyethyleneglycol or polypropyleneglycol; alkyleneglycols with 2 to 6 carbon atoms such as ethylene glycol, propylene glycol, butylene glycol, triethylene glycol, 1,2,6-hexanetriol, thiodiglycol, hexyleneglycol or diethylene glycol; lower alkylether acetates such as polyethyleneglycol monomethyletheracetate; glycerine; lower alkylethers or polyhydric alcohols such as ethyleneglycol monomethyl(or ethyl)ether, diethyleneglycol methyl (or ethyl) ether, triethyleneglycol monomethyl(or ethyl)ether; polyhydric alcohols such as trimethylolpropane or trimethylolethane; N-methyl-2-pyrrolidone, 2-pyrrolidone and 1,3-dimethyl-2-imidazolidinone. The water-soluble organic solvents mentioned above may be employed singly or as a mixture. Water is preferably used as deionized water.

The content of the water-soluble organic solvent in the black ink of the present invention is not particularly limited, but is preferably within a range of 3 to 50 wt. % with respect to the entire weight of the ink. Also the content of water contained in the ink is preferably within a range of 50 to 95 wt. % with respect to the entire weight of the ink.

Ink Properties: Particularly Ink Jet Discharge Characteristics and Penetrability to Recording Medium The black ink of the present invention may be employed as ink for a writing utensil or ink for ink jet recording. As the ink jet recording method, there are known a recording method of applying a kinetic energy to the ink thereby discharging a liquid droplet and a recording method of applying thermal energy to the ink and discharging a liquid droplet by bubble generation in the ink, and the ink of the present invention is particularly suitable for such recording methods. In case of employing the black ink of the present invention in the ink jet recording, such ink preferably has characteristics capable of being discharged from an ink jet head. With respect to the dischargeability from the ink jet head, the ink preferably has a viscosity within a range of 1 to 15 cps and a surface tension at least equal to 25 mN/m (dyne/cm), and more preferably a viscosity within a range of 1 to 5 cps and a surface tension within a range of 25 to 50 mN/m (dyne/cm).

Also for measuring the penetrability of the ink into the recording medium, there is known the Ka value determined by Bristov method. The ink penetrability represented by the ink amount V per 1 m$^2$, or the penetration amount V (ml/m$^2$=$\mu$m) of the ink into the recording medium after the lapse of a predetermined time t after the ink droplet discharge is given by the following Bristov equation:

$$V=Vr+Ka(t-tw)^{1/2}$$

Immediately after the deposition of the ink droplet onto the surface of the recording medium, the ink is mostly absorbed in the surface irregularities (surface coarseness) of the recording medium and scarcely penetrate into the interior thereof. Such period is represented by a contact time tw, and the ink amount absorbed in the irregularities of the recording medium in such contact time is Vr. After the lapse of the contact time from the ink deposition, the penetration amount into the recording medium increases in proportion to a ½ power of the time exceeding such contact time, namely (t−tw). Ka is a proportional coefficient of such increase and corresponds to the penetration rate. The value Ka can be measured by a dynamic penetration tester (for example the dynamic penetration tester S manufactured by Toyo Seiki Mfg. Co.) for liquid, utilizing the Bristov method. In the ink of the foregoing embodiments of the present invention, the Ka value is preferably maintained less than 1.5, more preferably at least equal to 0.2 and less than 1.5, in order to further improve the quality of the recorded image. A Ka value less than 1.5 is considered to induce solid-liquid separation in an early state of the ink penetration into the recording medium, thereby forming a high-quality image with extremely little feathering. The Ka value by the Bristov method in the present invention is measured by employing plain paper (for example PB sheet employed in an electrophotographic copying machine, a page printer (laser beam printer) or an ink jet recording printer manufactured by Canon Co. or a PPC sheet employed in an electrophotographic copying machine) as the recording medium. Also the environment of measurement assumes the normal office environment, for example a temperature of 20 to 25° C. and a humidity of 40 to 60%.

The preferred composition of the aqueous medium capable of having the aforementioned characteristics contains, for example, glycerine, trimethylol propane, thiodiglycol, ethylene glycol, diethylene glycol, isopropylalcohol and acetylene alcohol.

(2) Color Ink

As the coloring material employable in the color ink of the present invention, there can be employed known dyes and pigments. As the dye, there can be utilized, for example, an acidic dye, a direct dye etc. For example most of the anionic dyes can be used as long as they have suitable color and density regardless whether they are already known or newly synthesized. Also these dyes may be used as a mixture.

In the following there are given specific examples of the anionic dye:

(i) Yellow coloring material
  C.I. Direct yellow 8, 11, 12, 27, 28, 33, 39, 44, 50, 58, 85, 86, 87, 88, 89, 98, 100, 110, 132;
  C.I. Acid yellow 1, 3, 7, 11, 17, 23, 25, 29, 36, 38, 40, 42, 44, 76, 98, 99;
  C.I. Reactive yellow 2, 3, 17,. 25, 37, 42;
  C.I. Food yellow 3.

(ii) Red coloring material
  C.I. Direct red 2, 4, 9, 11, 20, 23, 24, 31, 39, 46, 62, 75, 79, 80, 83, 89, 95, 197, 201, 218, 220, 224, 225, 226, 227, 228, 229, 230;
  C.I. Acid red 6, 8, 9, 13, 14, 18, 26, 27. 32, 35, 42, 51, 52, 80, 83, 87, 89, 92, 106, 114, 115, 133, 134, 145, 158, 198, 249, 265, 289;
  C.I. Reactive red 7, 12, 13, 15, 17, 20, 23, 24, 31, 42, 45, 46, 59;
  C.I. Food red 87, 92, 94.

(iii) Blue coloring material
  C.I. Direct blue 1, 15, 22, 23, 25, 41, 76, 77, 80, 86, 90, 98, 106, 108, 120, 158, 163, 168, 199, 226;
  C.I. Acid blue 1, 7, 9, 15, 22, 23, 25, 29, 40, 43, 59, 62, 74, 78, 80, 90, 100, 102, 104, 117, 127, 138, 158, 161;
  C.I. Reactive blue 4, 5, 7, 13, 14, 15, 18, 19, 21, 26, 27, 29, 32, 38, 40, 44, 100.

(iv) Black coloring material
  C.I. Direct black 17, 19, 22, 31, 32, 51, 62, 71, 74, 112, 113, 154, 168, 195;
  C.I. Acid black 2, 48, 51, 52, 110, 115, 156;
  C.I. Food black 1, 2.

Solvent

The solvent or dispersing medium for the ink containing the aforementioned coloring material for the color ink can be, for example, water or a mixture of water and a water-soluble organic solvent. The water-soluble organic solvent can be similar to those described before for the black ink. Also in case of depositing such color ink onto the recording medium by the ink jet method (for example bubble jet method), the ink is preferably adjusted to desired viscosity and surface tension, in order to have satisfactory ink jet discharging characteristics.

Content of Coloring Material

The content of the coloring material in the color ink may be suitably selected, for example in case of use in the ink jet recording method, so as that the ink has the satisfactory ink jet discharging characteristics and also has the desired color and density, but, as a standard, is preferably selected within a range of 3 to 50 wt. % with respect to the entire weight of the ink. Also in case emphasis is given to the visual uniformity of the black image, it is particularly preferred to select the concentration of the dye in the color ink not exceeding 10 wt. % of the weight of the color ink. Also the amount of water contained in the ink is preferably selected within a range of 50 to 95 wt. % with respect to the entire weight of the ink.

Penetrability of Color Ink

In the color ink mentioned above, the Ka value at least equal to 5 is preferable in forming a high-quality image on the recording medium. Since the ink with such Ka value has high penetrability into the recording medium, there can be suppressed bleeding between the neighboring images even in case the images of at least two colors selected from yellow, magenta and cyan are recorded in mutually adjacent manner, and, also in case of forming an image of a secondary color by superposing these inks, the bleeding can be effectively suppressed with a neighboring image of a different color since each ink has high penetrability. The Ka value of the color ink can be adjusted as explained above by a known method such as the addition of a surfactant or the addition of a penetrating solvent such as glycolether. The amount of addition can naturally be selected suitably.

In the following there will be explained the inks prepared in the present embodiment, wherein parts and percentage are parts by weight and percentage by weight unless otherwise specified.

At first there will be explained the preparation of a pigment dispersion 1.

Pigment Dispersion 1

10 g of carbon black with a specific surface area of 230 m²/g and a DBP absorption amount of 70 ml/100 g and 3.41 g of p-amino-N-benzoic acid were mixed in 72 g of water, then 1.62 g of nitric acid was dropwise added and the mixture was agitated at 70° C. Then a solution obtained by dissolving 1.07 g of sodium nitrite in 5 g of water was further added and the agitation was continued for another hour. The obtained slurry was filtered with filter paper (Toyo Filter Paper No.2 manufactured by Advantis Co.), and the filtered pigment particles were sufficiently washed with water, then dried in an oven of 90° C. and added with water to obtain aqueous pigment dispersion of a pigment concentration of 10 wt. %. In this manner, the following hydrophilic radical was introduced to the surface of carbon black:

Then the above-mentioned pigment dispersion 1 was employed to prepare black ink 1 with the following formulation:

Black Ink 1

| | |
|---|---|
| pigment dispersion 1 | 30 parts |
| ammonium benzoate | 1 part |
| trimethylolpropane | 6 parts |
| glycerine | 6 parts |
| diethylene glycol | 6 parts |
| acetylene glycol-ethylene oxide addition product (Acetylenol EH (trade name) of Kawaken Fine Chemical Co.) | 0.2 parts |
| water | remainder |

In the black ink of the foregoing formulation, the black coloring material has high dispersibility because the aforementioned hydrophilic radical is introduced into the surface of carbon black. By mixing such black ink with mutually reactive color ink containing a reaction agent consisting of metal ions to be explained later, the hydrophilic radical of the black coloring material reacts with the metal ion to generate precipitate of the black coloring material. The black coloring material is thus prevented from moving to the print area of the non-reactive color ink adjacent to the print area of the black ink, whereby the bleeding phenomenon is reduced between the print area of the black ink and that of the non-reactive color ink.

Also the color inks of different colors (yellow ink 1, magenta ink 1, cyan ink 1) were prepared by mixing the following components. At the preparation, the components were dissolved in water under sufficient agitation and the obtained solution was filtered under pressure by a microfilter of a pore size of 3.0 μm supplied by Fuji Photo Film Co.

Yellow Ink 1

| | |
|---|---|
| acetylene glycol-ethylene oxide addition product (Acetylenol EH (trade name) of Kawaken Fine Chemical Co.) | 1.0 part |
| trimethylolpropane | 6 parts |
| glycerine | 6 parts |
| 2-pyrrolidone | 6 parts |
| C.I. acid yellow 23 | 3 parts |
| water | remainder |

Magenta Ink 1

| | |
|---|---|
| acetylene glycol-ethylene oxide addition product (Acetylenol EH (trade name) of Kawaken Fine Chemical Co.) | 1.0 part |
| trimethylolpropane | 6 parts |
| glycerine | 6 parts |
| 2-pyrrolidone | 6 parts |
| C.I. acid read 52 | 3 parts |
| water | remainder |

Cyan Ink 1

| | |
|---|---|
| acetylene glycol-ethylene oxide addition product (Acetylenol EH (trade name) of Kawaken Fine Chemical Co.) | 1.0 part |
| trimethylolpropane | 6 parts |
| glycerine | 6 parts |
| 2-pyrrolidone | 6 parts |
| C.I. acid blue 9 | 3 parts |
| water | remainder |

Also cyan ink 2 and 3 were prepared by adding magnesium nitrate in the amounts shown in Table 1 to the above-explained cyan ink 1. However the amount of water was adjusted according to the amount of addition of magnesium nitrate in such a manner that the concentrations of other components remain same as in the original cyan ink 1.

TABLE 1

| | Added amount of Mg nitrate | Metal ion concentration |
|---|---|---|
| Cyan ink 2 | 0.30% | 0.049% |
| Cyan ink 3 | 0.45% | 0.075% |

In the present embodiment, magnesium nitrate is employed as the metal salt added to the reactive color ink and divalent magnesium ion ($Mg^{2+}$) is dissolved as metal ion therein, but there may also be employed at least a polyvalent metal cation selected from $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

Also in the foregoing, the reactive color ink contains the metal salt (magnesium nitrate) in an amount of 0.30 or 0.45 wt. %, but the concentration of the metal salt contained in the reactive color ink can be selected within a range of 0.1 to 15 wt. %.

Evaluation of Bleeding and White Fog

Figure 6A:
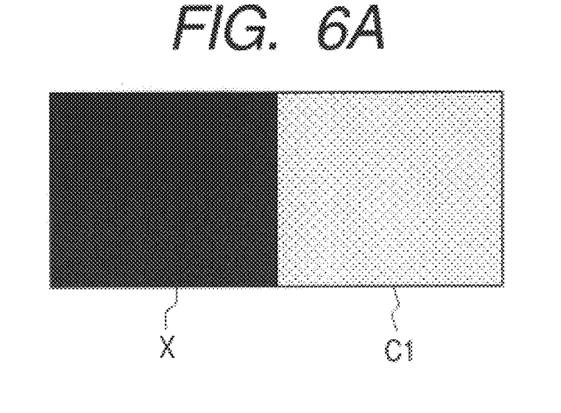
FIGS. 6A, 6B and 6C are views showing images for evaluation, printed on a recording sheet.
Figure 6B:
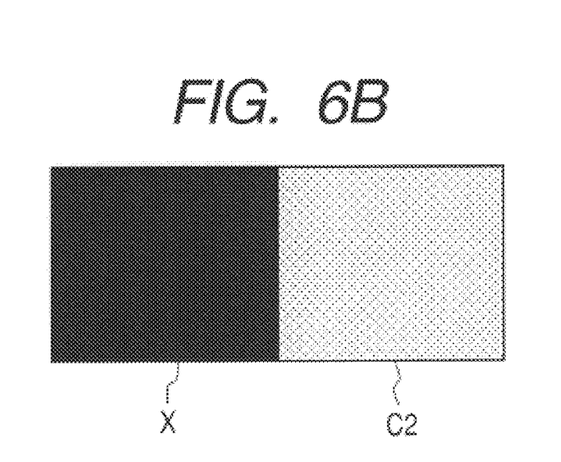
Figure 6C:
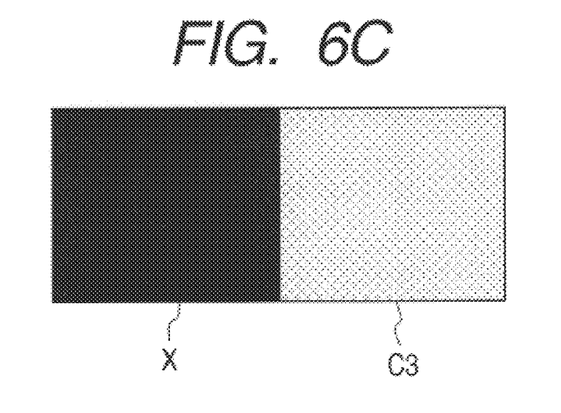

In the discharge port arrays of the recording head 1 shown in FIG. 1, the aforementioned inks were introduced in the combinations 1 to 5 shown in Table 2, and three evaluating images shown in FIGS. 6A to 6C were recorded on a recording sheet with a modified version of Canon ink jet printer BJF800. In FIGS. 6A to 6C an area X was recorded with black ink and reactive color ink.

The black ink was discharged with a discharge density of 600×600 dpi and with a discharge amount of 30 ng per drolet, while the color was discharged with a discharge density of 1200×600 dpi and with a discharge amount of 6.5 ng per droplet. Also the black print area was underprinted by the color ink with duties (%) shown in Table 3.

TABLE 2

| Ink-nozzle array combination | Bk 1 | C1 | C2 | C3 |
|---|---|---|---|---|
| 1 | Black ink 1 | Cyan ink 3 | Cyan ink 1 | Cyan ink 1 |
| 2 | Black ink 1 | Cyan ink 1 | Cyan ink 3 | Cyan ink 1 |
| 3 | Black ink 1 | Cyan ink 1 | Cyan ink 1 | Cyan ink 3 |
| 4 | Black ink 1 | Cyan ink 3 | Cyan ink 2 | Cyan ink 1 |
| 5 | Black ink 1 | Cyan ink 1 | Cyan ink 2 | Cyan ink 3 |

TABLE 3

| | Ink-nozzle array Combination | C1 | C2 | C3 |
|---|---|---|---|---|
| Condition 1 | 1 | 20% | 0% | 0% |
| Condition 2 | 2 | 0% | 20% | 0% |
| Condition 3 | 3 | 0% | 0% | 20% |
| Condition 4 | 4 | 10% | 10% | 0% |
| Condition 5 | 5 | 0% | 10% | 10% |

In mixed printing of black and color inks, the amount of a sheet feeding is equal to the width of a color discharge port array, so that, for the black printing, there was used only a portion (portion B in FIG. 3) of the black discharge port array Bk1 corresponding to the width of a color discharge port array from the upstream end in the sheet discharging direction (main scanning direction).

The three patterns shown in FIGS. 6A and 6B were recorded on each of the plain papers of several kinds available in the market of various countries (PB sheet supplied by Canon, Brilliant White Paper by Canon, Great White Inkjet by Union Camp, Jet Print by Hammermill, Xerox 4024 by Xero, Bright White Ink jet paper by Hewlett Packard and Rey Jet by Aussedat Rey), and the evaluation was made with the sample of the recording sheet judged as of the lowest level for each condition.

The result was evaluated as:

○ bleeding and white fog being scarcely noticeable and practically acceptable;

⊚ bleeding and white fog being unnoticeable.

The results of evaluation are shown in Table 4.

TABLE 4

| | between black print area and C1 ink area | between black print area and C2 ink area | between black print area and C3 ink area | metal ion per unit area in black print |
|---|---|---|---|---|
| Condition 1 | ⊚ | ⊚ | ⊚ | 0.214 ng/mm$^2$ |
| Condition 2 | ○ | ⊚ | ⊚ | 0.214 ng/mm$^2$ |
| Condition 3 | ○ | ○ | ⊚ | 0.214 ng/mm$^2$ |
| Condition 4 | ⊚ | ⊚ | ⊚ | 0.178 ng/mm$^2$ |
| Condition 5 | ○ | ⊚ | ⊚ | 0.178 ng/mm$^2$ |

As explained in the foregoing, an increase in the mutual reactivity with the black ink by the presence of a metal salt of a high concentration in the color ink is desirable for reducing the bleeding and white fog, but is undesirable in terms of reliability because the metal ions contained in the ink mist deposited on the ink discharge face of the recording head tends to deteriorate the ink discharge face and also because a higher concentration of the metal salt added to the ink increases the ink viscosity, thereby detrimentally affecting the discharge stability of the ink. It is therefore desirable to reduce the bleeding and white fog while maintaining the metal ion concentration in the mutually reactive ink at a lower level.

The results shown in Table 4 indicate that satisfactory results on the bleeding and white fog could be obtained in the conditions 1 and 4. The configuration of the recording head in the conditions 1 and 4 is such that the concentration of the metal ions is highest in the ink discharged from the discharge port array C1 and becomes successively lower in the ink from the array C2 and in the ink from the array C3. The metal ion concentration may be same in the adjacent arrays of the discharge ports, but is not higher in the discharge port array at the downstream side in the sheet discharging direction (main scanning direction) than in the array at the upstream side.

As explained in the foregoing, the concentration of the metal ions contained in the ink discharged from the color discharge port array C1, C2 or C3 is higher as the print distance of the print from the black print formed by the ink discharging portion (portion B) in the black ink discharge port array Bk1. It is thus rendered possible to lower the metal ion concentration in the reactive inks as a whole and also to reduce the bleeding and white fog, thereby attaining higher quality of the printed image and higher reliability of the recording head at the same time.

It was also found that very satisfactory results could be obtained for the bleeding and the white fog by changing the printing method even in the conditions 2, 3 and 5.

For example, it is possible to reduce the bleeding and the white fog by a recording method of depositing the reactive ink of a high metal ion concentration onto the recording medium prior to the black ink by at first feeding the sheet for depositing the reactive ink of a high metal ion concentration, then returning the sheet and executing the recording with the black ink. In case of applying this printing method to the configuration of the condition 3, the recording medium is advanced to a position where the recording area can be recorded with the discharge port array C3 of the recording head, and the recording by the array C3 (including the coating in the black area) is executed. Then the recording medium is reversed and the recording is executed with the portion B of the array Bk1 and the array C1 of the recording head. Subsequently the recording medium is advanced and the recording is executed with the array C2. Such configuration is called a condition 6, and the result of evaluation is shown in Table 5. As shown in Table 5, the recording method of the condition 6 provides satisfactory results on the bleeding and the white fog but the recording speed becomes much lower than in the condition 6.

TABLE 5

|  | between black print area and C1 ink print area | between black print area and C2 ink print area | between black print area and C3 ink print area |
|---|---|---|---|
| Condition 6 | ◎ | ◎ | ◎ |
| Condition 7 | ◎ | ◎ | ◎ |

Also as another printing method, there may be executed multi-pass recording employing recording in two or more paths. The multi-pass recording means a recording method in which the image in the recording area is completed by scanning motions of the nozzle array of each color by n times. In such divided recording, the number of scans is called the number of recording passes, and the recording duty per scan is reduced according to the increase in the number of passes whereby the image is so complemented as to be completed by n scans. In such method, since the total deposition amount of the ink onto the recording medium per scan is reduced to improve the ink fixation to the recording medium in each scan in comparison with the one-pass recording, whereby the bleeding and the white fog can be reduced.

Such multi-pass (4-pass) recording under the condition 3 is called a condition 7 and the result of evaluation is shown in Table 5. As shown in Table 5, this condition provides satisfactory results on the bleeding and the white fog but the recording speed becomes very low in comparison with that in the condition 3.

As explained in the foregoing, the bleeding and the white fog can be reduced in certain recording methods, but the recording speed is lowered in these cases. In contrast, the satisfactory level of bleeding and white fog can be realized while the loss in the recording speed can be prevented, by the head configuration of the present invention, in which the concentration of the metal ions contained in the ink discharged from the discharge port array C1, C2 or C3 increases as the print distance becomes shorter from the black print formed by the ink discharging portion (portion B) of the black ink discharge port array Bk1.

In the present embodiment, there has been explained a case of introducing cyan inks of mutually different addition amount of magnesium nitrate into the discharge port arrays C1, C2 and C3, but the color of the inks is not restrictive and may be arbitrarily selected if the concentration of the metal ions contained in the inks discharged from the arrays C1, C2 or C3 increases as the print distance becomes shorter from the black print.

For example, by employing the aforementioned recording head 1 and introducing the black ink 1 into the discharge port array Bk1, the cyan ink 3 (metal ion concentration 0.075%) into the discharge port array C1, the magenta ink 1 (metal ion concentration 0%) into the discharge port array C2 and the yellow ink 1 (metal ion concentration 0%) into the discharge port array C3, there could be attained a condition similar to the aforementioned condition 1 with respect to the metal ion concentrations in the color inks and there could be obtained satisfactory results similar to those in the condition 1 shown in Table 4.

Also the present invention is applicable not only to the recording head 1 of the configuration shown in FIG. 3. For example in the recording head 2 of the configuration shown in FIG. 4, the print distance from the black print formed by the black discharge port array Bk2 (namely the distance therefrom) increases in the order of arrays C4, C5 and C6, so that the metal ion concentrations in the inks introduced into the discharge port arrays are to be decreased in the order of C4, C5 and C6.

Also in the recording head 3 of the configuration shown in FIG. 5, the print distance from the black print formed by portion A of the black discharge port array Bk3 increases in the order of arrays C7, C8 and C9 in case of color printing in the scanning direction a while the print distance from the black print formed by portion B of the black discharge port array Bk3 increases in the order of arrays C11, C10 and C9 in case of color printing in the scanning direction b, so that the metal ion concentrations in the inks introduced into the discharge port arrays are to be decreased in the order of C7, C8 and C9 and in the order of C11, C10 and C9. Stated differently the metal ion concentration is to be made highest in the inks of the outermost discharge port arrays and made lower toward the inner arrays.

Furthermore, in the present embodiment there has been explained the bleeding phenomenon and the white fog between black and color, but the color combination is naturally not limited to such case. Also the reactivity has been explained in the present embodiment by the reaction between the metal ion and pigment, but the head configuration and the recording apparatus of the present invention are naturally applicable to any mutual reactivity.

In the present embodiment, there has been explained a case where the discharge port arrays for the respective inks are formed within a single head unit, but the intention of the present invention can be attained also in case the discharge port arrays are formed in different head units, and the ink jet recording apparatus may be so constructed as to be capable of recording onto the recording medium with such configuration of the discharge port arrays.

Wiping of Ink Discharge Face of Recording Head

In the following there will be explained the method of wiping the ink discharge face of the recording head with reference to FIGS. 7A and 7B, in which W indicating the wiping direction.

Figure 7A:
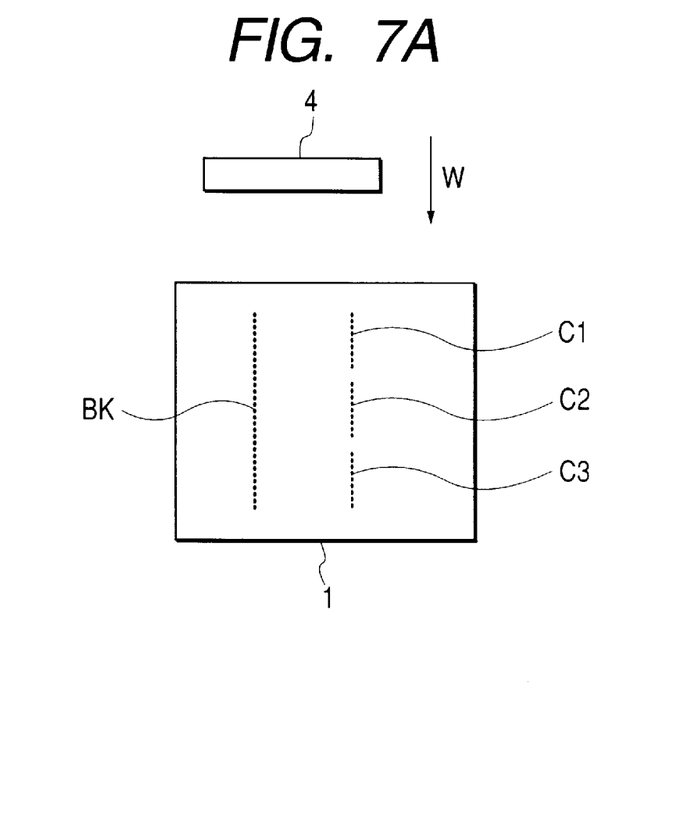
FIGS. 7A and 7B are views showing the method for wiping the ink discharge face of the recording head.
Figure 7B:
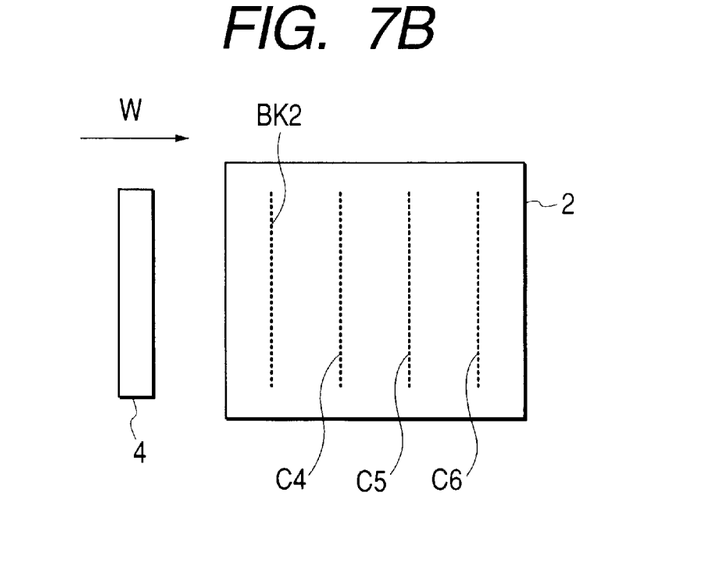

The example shown in FIG. 7A employs the recording head 1 shown in FIG. 1 in which the metal ion concentration in the ink introduced in the respective color ink discharge port array is highest in the array C1 and decreases in the order of C1, C2 and C3.

The wiping of the ink discharge face of the recording head 1 is executed by moving a wiper provided in the recording apparatus in a direction shown in FIG. 7A. In this operation, the wiper 4 passes the color ink discharge port arrays in succession in the order of C1, C2 and C3. The inks come out from the discharge ports and the wiper 4 is impregnated with the inks in the order of the ink from the array C1, that from the array C2 and that from the array C3. As a result, the ink of a relatively high metal ion concentration, impregnated earlier in the wiper 4, is diluted with that of a relatively low metal ion concentration impregnated later in the wiper 4, whereby the metal ion concentration is lowered at least in the end portion (coming into contact with the ink discharge face of the recording head) thereby suppressing the formation of aggregate of the additive substance.

Such successive wiping from the discharge port array employing the ink of a relatively high metal ion concentration to the discharge port array employing the ink of a relatively low metal ion concentration allows to reduce the metal ion concentration contained at least in the end portion of the wiper 4, thereby easily avoiding deposition of the aggregate of the metal ions on the end surface of the wiper.

The wiping method of the present invention is applicable not only to the recording head 1 of the configuration shown in FIG. 3. For example in the recording head 2 of the configuration shown in FIG. 4, in which the metal ion concentration of the ink in the color ink discharge port array decreases in the order of C4, C5 and C6, the wiper is moved from left to right, as shown in FIG. 7B, to execute the wiping operation in the order of the arrays Bk2, C4, C5 and C6, thereby reducing the metal ion concentration contained at least in the end portion of the wiper 4, and easily avoiding deposition of the aggregate of the metal ions on the end surface of the wiper.

Also in the recording head 3 of the configuration shown in FIG. 5, in which the metal ion concentration of the ink in the color ink discharge port array decreases in the order of C7, C8 and C9 and in the order of C11, C10 and C9, the wiper is at first moved from left to right to execute the wiping operation in the order of the arrays Bk3, C7, C8 and C9, and then in the order of the arrays C11, C10 and C9, thereby reducing the metal ion concentration contained at least in the end portion of the wiper 4, and easily avoiding deposition of the aggregate of the metal ions on the end surface of the wiper.

As explained in the foregoing, the ink jet recording head of the present invention and the ink jet recording apparatus mounted with such ink jet recording head are so constructed that in an array of the discharge ports having a relatively shorter print distance from the print obtained by an array of the discharge port for a first ink, there is introduced an ink showing a mutual reactivity equal to or higher than that of the ink introduced into an array of the discharge ports having a relatively longer print distance from the print obtained by the aforementioned array of the discharge ports, or that in an array of the discharge ports having a relatively shorter distance from an array of the discharge port for a first ink, there is introduced an ink showing a mutual reactivity equal to or higher than that of the ink introduced into an array of the discharge ports having a relatively longer distance from the aforementioned array of the discharge ports, thereby reducing the concentration of the reactant (metal ion) in the reactive ink as a whole and also reducing the bleeding and the white fog phenomena.

Also the ink jet recording apparatus of the present invention is so constructed that, when a wiper wipes a portion of the plural arrays of the discharge ports, other than the array for a first ink, on the ink discharge face, the wiping operation is executed on such arrays in the increasing order of the print distance thereof from the print formed by the aforementioned array of the discharge ports for the first ink, thereby reducing the metal ion concentration contained at least in the end portion (coming into contact with the ink discharge face of the recording head) of the wiper 4, and easily avoiding deposition of the aggregate of the metal ions on the end surface of the wiper.

What is claimed is:

1. An ink jet recording head at least provided with a first discharge port group for discharging a first ink, a second discharge port group for discharging a second ink having a mutual reactivity with the first ink, and a third discharge port group for discharging a third ink having no mutual reactivity with the first ink or having a mutual reactivity with the first ink lower than the second ink, the ink jet recording head performing recording by scanning reciprocally, wherein the second and third discharge port groups are provided in respective discharge port arrays different from an array of the first discharge port group, and the second discharge port group, having the second ink with the higher mutual reactivity with the first ink, is provided at a location upstream from the third discharge port group in a main scanning direction of the head, said third discharge port group having the third ink with the lower mutual reactivity with the first ink.

2. An ink jet recording head according to claim 1, wherein said first ink is black ink and said second ink is color ink.

3. An ink jet recording head according to claim 2, wherein said second ink contains a metal ion.

4. An ink jet recording head according to claim 3, wherein said metal ion is at least a multivalent cation selected from $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

5. An ink jet recording head according to claim 3, wherein said second ink contains a metal salt in an amount of 0.1 to 15 wt. % with respect to the entire weight of said second ink.

6. An ink jet recording head according to claim 2, wherein said black ink contains a salt and employs a black pigment as a coloring material.

7. An ink jet recording apparatus mounted with an ink jet recording head according to any of claims 1, 2, or 3–6 and adapted to execute recording by discharging ink from said ink jet recording head and depositing ink onto a recording medium.

8. An ink jet recording apparatus according to claim 7, further comprising wiping means for cleaning an ink discharge face of said ink jet recording head by moving a wiper in contact with said ink discharge face, wherein said wiper is so constructed, in wiping the portion of the plural arrays of the discharge ports on said ink discharge face, other than the array of the discharge ports for said first ink, as to execute wiping in the increasing order of the distance from the print formed by the array of the discharge ports for said first ink.

* * * * *

UNITED STATES PATENT AND TRADEMARK OFFICE
CERTIFICATE OF CORRECTION

PATENT NO. : 6,679,585 B2
DATED : January 20, 2004
INVENTOR(S) : Masao Kato et al.

It is certified that error appears in the above-identified patent and that said Letters Patent is hereby corrected as shown below:

Column 1,
Line 12, "there" should read -- it --; and
Line 22, "9-1188505," should read -- 9-118850, --.

Column 9,
Line 7, "large," should read -- great, --;
Line 15, "stable" should read -- a stable --; and
Line 29, "details" should read -- detail --.

Column 11,
Line 44, "same" should read -- the same --; and
Line 60, "thereby" should read -- thereby permitting a --.

Column 13,
Line 28, "No. 33." should read -- No. 33, --;
Line 58, "stable" should read -- a stable --; and
Line 64, "without" should read -- without a --.

Column 15,
Line 1, "are" should read -- is --;
Line 18, "by" (first occurrence) should read -- by the --; and
Line 28, "penetrate" should read -- penetrates --.

Column 16,
Line 10, "17,." should read -- 17, --; and
Line 16, "27." should read -- 27, --.

Column 17,
Line 5, "in" should read -- in a --.

Column 18,
Line 32, "read" should read -- red --.

Column 19,
Line 19, "drolet," should read -- droplet, --; and
Line 58, "Xero," should read -- Xerox, --.

Column 21,
Line 49, "amount" should read -- amounts --.

UNITED STATES PATENT AND TRADEMARK OFFICE
CERTIFICATE OF CORRECTION

PATENT NO. : 6,679,585 B2
DATED : January 20, 2004
INVENTOR(S) : Masao Kato et al.

It is certified that error appears in the above-identified patent and that said Letters Patent is hereby corrected as shown below:

Column 22,
Line 42, "indicating" should read -- indicates --;
Lines 55 and 56, "that" should read -- then --.

Column 24,
Line 38, "claims 1, 2, or 3-6" should read -- claims 1-6 --.

Signed and Sealed this

Seventh Day of September, 2004

JON W. DUDAS
*Director of the United States Patent and Trademark Office*